Patented Apr. 3, 1951

2,547,493

UNITED STATES PATENT OFFICE 2,547,493

IMIDO-ESTERS OF DIELS-ALDER ADDUCTS AND PROCESS FOR PRODUCING SAME

Stanley P. Rowland, Philadelphia, Pa., assignor to Rohm & Haas Company, Philadelphia, Pa., a corporation of Delaware No Drawing. Application December 1, 1949, Serial No. 130,599

12 Claims. (Cl. 260—101)

This invention relates to a new class of resinous imido-esters and to a process for preparing them.

The products of this invention are imido-esters of high molecular weight which in many cases are polymeric. They are made by reacting an azoline; that is, an oxazoline or a thiazoline, with a Diels-Alder adduct of maleic anhydride and a member of the class consisting of rosin, esters of rosin, China-wood oil, and dehydrated castor oil.

It is known that rosin and its esters, China-wood or tung oil, and dehydrated castor oil contain conjugated systems; that is, alternating arrangements of single bonds and two double bonds within the molecules of the materials. It is also known that maleic anhydride, like itaconic and citraconic anhydrides, reacts at the point of conjugation with these materials by so-called "1-4 addition" to form a "maleic adduct." The above are only a few of the many conjugated compounds which form such adducts and the preparation of the adducts is widely known as the "diene synthesis" which can be illustrated by the following schematic equation:

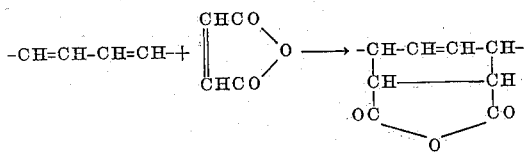

For a further understanding of the Diels-Alder reaction or the diene synthesis and of the formation of "maleic adducts," reference is made to "The Chemistry of Synthetic Resins" by Ellis (Reinhold Publishing Corporation, New York, N. Y. 1935), particularly chapter 40, the references therein and the subsequent literature.

It has now been found that the maleic adducts of the Diels-Alder type react with azolines to form an entirely new class of imido-esters according to the following schematic equation in which the azoline is shown in its skeletal form,

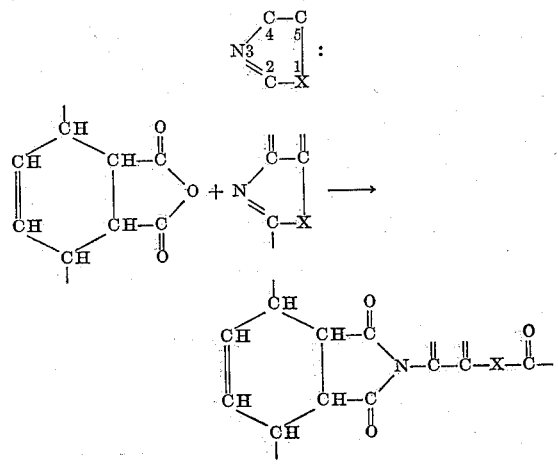

The reaction may be better understood from the following equation which represents the reaction between the maleic adduct of resin and 2-heptadecadienyl-5-methyl oxazoline:

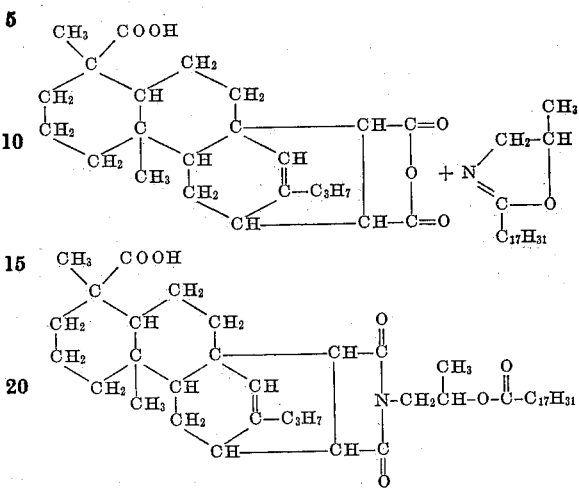

As would be expected, the new imido-esters have properties which are quite unlike those of the azolines or adducts from which they are made. These properties make the new compounds very useful as surface-coatings, as plasticizers, and as lube-oil additives, for example.

Not only do the adducts of rosin (which is essentially abietic acid and which, for purposes of this invention, is the full equivalent thereof) react with azolines but the adducts of the esters of rosin react as well. Thus, the carboxyl group of the rosin adduct can be esterified with monohydric or polyhydric alcohols either prior to or after the reaction with the azoline. A large number of esters of rosin are known and many are commercially available. All of these form adducts with maleic anhydride which in turn react with the azolines to form the products of this invention. Typical esters include methyl and ethyl abietate, glycol esters such as those of ethylene and polyethylene glycol, glyceryl esters, commonly known as ester gum, the partial and complete esters of pentaerythritol and of the carbohydrates such as sorbitol and mannitol. As far as the reaction of this invention is concerned, it matters not whether the rosin (or abietic acid) is partially or completely esterified or whether it is esterified with a monohydric, polyhydric, aliphatic or aromatic alcohol because the ester group is not affected during the reaction with the azoline. The salts of rosin, such as those of ammonia, quaternary ammonium hydroxides, and of the alkali, alkaline earth, and heavy metals, also form adducts which react with azolines, or alternatively can be formed after the reaction with the azoline by simple neutralization of the carboxyl group of the rosin.

The maleic anhydride adducts of China-wood or tung oil and dehydrated castor oil react with the azolines in the same manner as do the rosin-adducts. Tung oil is essentially (about 86%) the glyceryl ester of alpha- and beta-elaeostearic acids which are conjugated. The adducts of these acids have, respectively, the following structures:

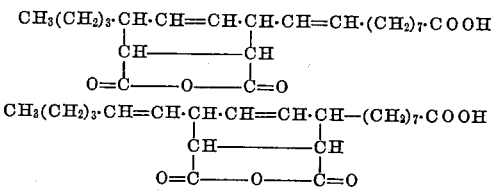

Dehydrated castor oil, which is an article of commerce, contains the glyceryl ester of conjugated octadecadien-9,11-oic acid. The adduct of this acid has the following structure:

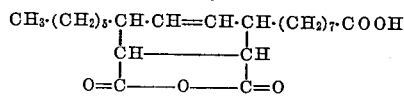

The oxazolines and thiazolines which react with the maleic anhydride adducts of rosin and its esters, tung oil and dehydrated castor oil are themselves also well known, although it was not known heretofore to make new imido-esters of high molecular weight by reacting these azolines with the adducts. All of the reactive azolines have the general formula

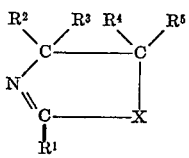

in which X is an atom of sulfur or oxygen; the characters $R^2$, $R^3$, $R^4$ and $R^5$ represent hydrogen atoms or monovalent, organic radicals which are unreactive with acid anhydrides and which, therefore, are free of alcoholic hydroxyl groups and amino-hydrogen atoms, and which preferably are hydrocarbon groups; and in which $R^1$ also represents the same kind of monovalent, organic radicals as do $R$'s$^{2\ to\ 5}$ but does not represent a hydrogen atom.

The organic radicals which are represented by $R$'s$^{1\ to\ 5}$ must be unreactive with acid anhydrides. Whether a particular substituent is reactive with acid anhydrides is well within the knowledge of one skilled in chemistry. That is, $R$'s$^{1\ to\ 5}$ must be entirely free of such substituents as hydroxy groups and amino hydrogen atoms which are capable of reacting with acid anhydrides, so that no interfering side-reactions can take place. It is preferred that these radicals be hydrocarbon radicals such as alkyl, aryl, alkaryl, aralkyl and cycloalkyl groups. The following list includes examples of such suitable hydrocarbon radicals: Methyl, ethyl, isopropyl, sec.-butyl, tert.-amyl, 2-ethylhexyl, lauryl, n-tetradecyl and octadecyl groups and the isomers of these groups; phenyl, tolyl, benzyl, p-octylphenyl, m-xylyl, 2,4-di-tert.-amyl phenyl; cyclohexyl; and naphthyl groups. In addition, the hydrocarbon group which is represented by $R^1$ can be unsaturated. In fact, a particularly valuable group of products are those in which $R^1$ is unsaturated. Such products have the added advantage of being more reactive and subject to oxidation and polymerization due to their unsaturation.

Although those reactants are preferred in which the substituents represented by the R's are hydrocarbons, it is a fact that the products of this invention are readily prepared from the azolines in which the substituents $R$'s$^{1\ to\ 5}$ also contain other elements in addition to carbon and hydrogen. Thus, halogen groups may be present in the R-substituents as well as nitro, ether, keto, aldehydo, sulfonic, carboxyl, or teritary amine groups.

A large class of operable oxazolines and thiazolines are known and are shown in the literature. All of these react with the above-described adducts by the methods set forth in the examples below. All that is required is to substitute an equivalent amount of one azoline; i. e., an oxazoline or a thiazoline, for the particular azolines shown in the examples. Thus, in the same manner, the following azolines, of which the skeletal structure is

and in which X is an oxygen atom in oxazolines or a sulfur atom in thiazolines, combine in equimolecular amounts with the anhydride groups in the maleic anhydride adducts to form the new imido-esters of this invention: 2-phenyl azolines; 2-p-tolyl azolines; 2-o-tolyl azolines; 2-benzyl azolines; 2-(o-, m-, and p-nitrophenyl) azolines; p-chlorobenzyl azolines; 2-undecyl-5-chloromethyl azolines; 2,4-diphenyl azolines; 2,5-diphenyl azolines; 2-phenyl-5-chloromethyl azolines; 2 - (p- nitrophenyl) - 5 - chloromethyl azolines; 2-(p-nitrophenyl) - 5 -diethylaminomethyl azolines; 2 - (p-nitrophenyl) - 5 - dibutylaminomethyl azolines; 2-phenyl-5,5-dimethyl azolines; 2-phenyl-5-phenyl-5-methyl azolines; 2-(m- and p-nitrophenyl) -5,5-dimethyl azolines; 2-(alpha- or beta-naphthyl) azolines; 2- p -methoxyphenyl azolines; 2 - p - ethoxyphenyl azolines; 2 - p - butoxyphenyl azolines; 2-(m - nitro - p - methoxyphenyl) azolines; 2-(p-nitrophenyl) -4-butyl azolines; 2-(p-nitrophenyl - 4 - phenyl azolines; 2-phenyl-5-methyl azolines; 2-phenyl-5-ethyl azolines; 2-benzyl-5-methyl azolines; 2 - styryl - 5 - methyl azolines; 2-(o- and p-tolyl)-5-methyl azolines; 2-(alpha- and beta-naphthyl) -5-methyl azolines; 2-phenyl-4,5-dimethyl azolines; 2-(p-nitrophenyl) -4,5-dimethyl azolines; 2-phenyl-4-methyl-5-ethyl azolines; 2,4,5 - trimethyl azolines; 2-undecyl-4,4-dimethyl azolines; 2-phenyl-4-methyl-4-ethyl azolines; 2-phenyl-4,4-dimethyl azolines; 2- heptadecyl azolines; 2 - heptadecenyl azolines; 2-heptadecyl-4,4-dimethyl azolines; 2-heptadecenyl-5-ethyl azolines; 2-phenyl-4-methyl-5-phenyl azolines; 2- methyl - 4,5,5 - triphenyl azolines; 2-phenyl-4-methyl - 5 - phenyl azolines; 2-methyl-4,5,5-triphenyl azolines; 2-phenyl-4-methyl-5,5-dibenzyl azolines; 2-heptadecyl-5-diethylaminomethyl azolines; 2-heptadecenyl-5-ethyl azolines; 2-heptadecenyl-4,5,5-trimethyl azolines; 2,4,5-triisobutyl azolines; 2-heptadecyl-4,4,5,5-tetramethyl azolines; 2 - methyl - 4-isoamyl-4-methyl azolines; 2-heptadecyl-4-propyl-5-methyl azolines; 2-heptadecenyl-4,4-dimethyl-5-isopropyl azolines; 2-decyl-4,4-dibutyl-5-methyl azolines; and 2-heptadecyl-5-methyl-5-ethyl azolines.

The reaction between the azolines and the adducts takes place fairly readily and often exothermically. Reaction takes place even at room temperature (ca. 20° C.) especially when the azoline and adduct are dissolved in a volatile solvent and are deposited as a thin air-drying film. Heating of the reactants accelerates the rate of reaction and for this reason a minimum temperature of 50° C. is recommended. Temperatures up to 300° C. are operable but at the higher temperatures by-products and gels are frequently formed. Accordingly, an upper temperature of 250° C. is much preferred. When the product is to be isolated in bulk, the reactants are combined in a reactor; but this is not always necessary. For example, a mixture of the reactants, preferably in solution, can be applied to the surface of an object which it is desired to coat and protect, and the coated object can then be baked in an oven. During the baking period, the reactants combine to form the new imido-ester as a firm coating on the object. This procedure is especially effective in those cases where the azoline contains an unsaturated, long-chain substituent in the 2-position ($R^1$). For convenience in carrying out the reaction, inert solvents can be employed. Likewise, catalysts such as alcoholates, zinc chloride, and the like can be used, although ordinarily the reaction takes place rapidly enough in the absence of catalysts. Other expedients well known to those skilled in the art, such as variations in pressure, solvent-extraction of the product, excess of one reactant and the like, can be used without departing from the spirit of the invention.

It is evident from the schematic equation above that one mole of azoline combines with one anhydride group in the maleic anhydride adduct. The course of the reaction, therefore, is easily followed by titrating the reaction mixture with standard alkali since the alkali neutralizes the free and unreacted anhydride groups. Such is a conventional method of determining the acid number of resinous materials. As the reaction progresses by reaction of the azoline with the anhydride groups in the adduct, the acid number of the reaction mixture decreases. In some cases it is desirable to employ less than enough azoline to react with all of the anhydride groups in the adduct, and when such is the case the unreacted anhydride groups can be readily converted to salts, for example, by neutralization, or to esters by reaction with alcohols. Alternatively some of the anhydride groups can be neutralized or esterified first and the remainder then reacted with the azoline.

The following examples are presented in order to illustrate—and not to limit—this invention. The reaction of the oxazolines and thiazolines with the maleic anhydride adducts is ordinarily complete after two to about four hours of heating at about 150° C. to about 200° C. The reaction provides a large class of new imido-esters which have high molecular weight and which differ in degree from one another as regards the substituents, $R$'s $^1$ to $^5$, on the azolines. All of the azolines, however, react in the same way provided they are free of substituents which react with acid anhydrides, particularly alcoholic hydroxyl groups and amino-hydrogen atoms, and one azoline can be substituted for another in the processes set forth in the following examples.

*Example 1*

A maleic anhydride adduct was made by heating one mole of ester gum (A. N. 5) with 2.7 moles of maleic anhydride at 200° C. for 30 minutes. The adduct had an acid number of 251. Thereafter, 2.7 moles of 2-heptadecadienyl-5-methyl oxazoline was added, and the reaction mixture was maintained at 180° C. for 2.5 hours. The product was a viscous resin which was soluble in aromatic and aliphatic hydrocarbons, had an acid number of 7.6 and had a viscosity of 7 poises when measured at 25° C. as a 60% solution in mineral thinner. This product, when treated as a surface-coating, was found to dry more rapidly and to have superior resistance to caustic solutions than conventional alkyd resins. Alone, it produced brittle films but, when compounded into a varnish with an equal weight of oil (2 parts tung and 1 part linseed oils), it gave a varnish which dried very rapidly to hard, tough, and glossy films.

*Example 2*

A rosin-maleic anhydride adduct having an acid number of 403 was prepared by heating 1 mole of rosin and 0.9 mole of maleic anhydride for 30 minutes at 200° C. To this was added 0.9 mole of 2-abietyl oxazoline and the mixture was heated for 2.5 hours at 200°–225° C. The resinous mass was poured into pans and on cooling it solidified to a brittle resin having a melting point of 116°–125° C. and an acid number of 122. It was soluble in xylene, acetone, ethylene dichloride, and hexylene glycol. This product was tested as an ink vehicle and the resultant inks were characterized by fast drying-rates, good gloss and good color.

*Example 3*

An imido-ester derived from the maleic anhydride adduct of tung oil was prepared as follows: One mole of China-wood oil was stirred and heated with 2.55 moles of maleic anhydride for 30 minutes at 150° C., then for 30 minutes at 200° C., and finally for 30 minutes at 250° C. This adduct which was clear and viscous was then combined chemically with 2.55 moles of 2-heptadecyl-oxazoline by heating the two reactants for 2.5 hours at 200° C. The product, a viscous liquid, had an acid number below 15, good film-forming properties, was soluble in common hydrocarbon solvents and was compatible with linseeed oil and unmodified tung oil.

*Example 4*

An adduct of dehydrated castor oil was prepared by heating for 2 hours at 175° C. one mole of commercially available dehydrated castor oil and 2.6 moles of maleic anhydride. This product was then converted to an imido-ester by combination with 2.6 moles of undecyl-5-ethyl oxazoline. The reaction mixture was heated at 200° C. for 2.5 hours. Here as in the case of Example 3, the product was a viscous oil which was compatible with varnish oils and varnish solvents.

*Example 5*

An adduct of dehydrated castor oil, made by heating one mole of dehydrated castor oil with 2.6 moles of maleic anhydride for two hours at 175° C., was combined with 2.6 moles of 2-heptadecadienyl-5-methyl oxazoline by heating for one hour at 300° C. under a blanket of nitrogen. The product, a very viscous oil, was soluble in hydrocarbon solvents and was compatible with conventional varnish oils and resins. In addition, the product, when treated with a drier to the extent of 0.05% cobalt (as naphthenate) and applied as a film on a glass plate, air-dried overnight to a very flexible film.

Another ester-imide was made in the same way from a maleic anhydride adduct of dehydrated castor oil and 2-heptadecadienyl-thiazoline. Like the product described immediately above, this compound was a viscous oil which had similar solubility and air-drying properties.

Thiazolines react with the maleic adducts of rosin, rosin esters, tung oil, and dehydrated castor oil in the same way as do the corresponding oxazolines and the products are substantially like those of the oxazolines especially when the substituents on the azolines contain long carbon chains which tend to mask the presence of the oxygen or sulfur atoms.

*Example 6*

In order to illustrate the variety of azolines which react with the adducts according to the process of this invention and to illustrate the general ease with which the reaction takes place, several azolines were heated with a maleic anhydride-adduct of ester gum (the glyceryl ester of rosin) prepared by heating one mole of ester gum and 2.7 moles of maleic anhydride for one hour at 200° C. The adduct had an original acid number of 251 but, as the ester gum-maleic adduct was heated with the azoline, the acid number of the reaction mixture decreased and in every case the acid number fell below 10 while the reaction mixture was being heated for three hours at 225° C. The following azolines were thus reacted with ester gum adduct: 2-butyl oxazoline and thiazoline; 2-heptyl-5-methyl oxazoline and thiazoline; 2-undecyl-5-methyl oxazoline and thiazoline; 2-phenyl-4-methyl oxazoline and thiazoline; 2-p-chlorophenyl oxazoline; 2-phenyl-4,4,5-trimethyl oxazoline; 2-p-nitrophenyl-5-ethyl oxazoline; 2-heptadecyl-5-methyl oxazoline and thiazoline; 2-heptadecenyl-5-methyl oxazoline and thiazoline; 2-heptadecadienyl-oxazoline and thiazoline.

The adducts of rosin, tung oil, or dehydrated castor oil react in the same way as the adduct of ester gum or of other esters of abietic acid. Reaction occurs at the anhydride grouping in the molecule of the adduct, combination takes place together with the splitting or opening of the azoline ring and the formation of linear imido-ester substituents on the adduct in accordance with the general equation given above.

The products of this invention are all imido-esters which, therefore, have an unusual chemical configuration which makes them valuable as intermediates for the production of other new compounds. In their own rights, the products, which range from oils to resinous solids, have a wide variety of uses. Thus they are eminently suited as lube-oil additives, as plasticizers for synthetic resins and cellulosic plastics, as modifiers for surface-coating compositions, as film-forming materials especially when the substituent represented by $R^1$ is unsaturated.

I claim:

1. A process for the preparation of new imido-esters, which comprises chemically combining, at a temperature from 20° C. to 300° C., (1) a Diels-Alder adduct of maleic anhydride and a member of the class consisting of rosin, esters of rosin, tung oil and dehydrated castor oil, with (2) an azoline of the general formula

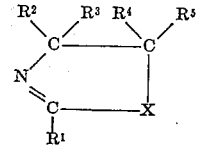

in which X represents an atom of an element from the class consisting of oxygen and sulfur; $R^2$, $R^3$, $R^4$, and $R^5$ represent members of the class consisting of hydrogen atoms and alkyl, aryl, aralkyl, alkaryl, and cycloalkyl groups; and $R^1$ represents a member of the class consisting of alkyl, aryl, aralkyl, alkaryl, and cycloalkyl groups and monounsaturated and diunsaturated aliphatic hydrocarbon groups containing not more than 17 carbon atoms.

2. A process for the preparation of imido-esters, which comprises chemically combining at a temperature of 20° C. to 250° C. a Diels-Alder adduct of rosin and maleic anhydride with 2-heptadecenyl oxazoline.

3. A process for the preparation of imido-esters, which comprises chemically combining at a temperature of 20° C. to 250° C. a Diels-Alder adduct of rosin and maleic anhydride with 2-heptadecadienyl-5-methyl oxazoline.

4. A process for the preparation of imido-esters, which comprises chemically combining at a temperature of 20° C. to 250° C. a Diels-Alder adduct of rosin and maleic anhydride with 2-heptadecadienyl-thiazoline.

5. New compositions of matter as prepared by the process of claim 1.

6. New compositions of matter as prepared by the process of claim 2.

7. A new composition of matter as prepared by the process of claim 3.

8. A new composition of matter as prepared by the process of claim 4.

9. A process for the preparation of imido-esters which comprises chemically combining at a temperature of 20° C. to 250° C. a Diels-Alder adduct of ester gum and maleic anhydride with 2-heptadecadienyl-5-methyloxazoline.

10. A process for the preparation of imido-esters which comprises chemically combining at a temperature of 20° C. to 250° C. a Diels-Alder adduct of tung oil and maleic anhydride with 2-heptadecadienyl-5-methyloxazoline.

11. A new composition of matter as prepared by the process of claim 9.

12. A new composition of matter as prepared by the process of claim 10.

STANLEY P. ROWLAND.

No references cited.